United States Patent
Uetake et al.

[11] 3,912,359
[45] Oct. 14, 1975

[54] MICROSCOPE OBJECTIVES OF GAUSSIAN TYPE HAVING INCLINED OPTICAL AXIS

[75] Inventors: Toshifumi Uetake; Masaki Matsubara; Yoshisada Hayamizu, all of Hachioji, Japan

[73] Assignee: Olympus Optical Co., Ltd., Tokyo, Japan

[22] Filed: Jan. 14, 1974

[21] Appl. No.: 433,384

[30] Foreign Application Priority Data

| Jan. 16, 1973 | Japan | 48-7635 |
| Apr. 11, 1973 | Japan | 48-40064 |
| July 23, 1973 | Japan | 48-82832 |
| Nov. 2, 1973 | Japan | 48-122933 |

[52] U.S. Cl. ............ 350/36; 350/175 ML; 350/181; 350/217; 350/222
[51] Int. Cl.² ............ G02B 9/36; G02B 21/22
[58] Field of Search ........ 350/32, 36, 175 ML, 181, 350/136, 217, 222; 33/20 D

[56] References Cited
UNITED STATES PATENTS

| 2,354,614 | 7/1944 | Reason | 350/181 |
| 3,320,017 | 5/1967 | Schade | 350/222 |
| 3,744,881 | 7/1973 | Taira | 350/175 ML |

Primary Examiner—John K. Corbin
Attorney, Agent, or Firm—Waters, Schwartz & Nissen

[57] ABSTRACT

Microscope objectives and more particularly a binocular stereo-microscope objective of the Gaussian type and comprises six lenses arranged in four components successively from an object side, said first component is a positive meniscus lens, said second component is a doublet including a positive meniscus lens and a negative meniscus lens, said third component is a doublet or two singlets including a negative meniscus lens adjoining a diaphragm and a positive meniscus lens, and said fourth component is a positive meniscus lens, and which satisfies the following five conditions, i.e., 1. $0.1f < l < 0.4f$,
2. $0.2f < R_5 < 0.4f$,
3. $0.2f < |R_6| < 0.4f$, $R_6 < 0$,
4. $0.030f < d_3+d_4 < 0.08f$, and
5. $0.030f < d_6+d_7 < 0.08f$, wherein $f$ is the overall focal length of the objective, $l$ is the total length of the objective, $R_5$ and $R_6$ are the radii of curvature of the lens faces opposed to a diaphragm, respectively, $d_3$ and $d_4$ are the axial lens thicknesses of the two lenses of the second component, respectively, and $d_6$ and $d_7$ are the axial lens thicknesses of the two lenses of the third component, respectively. The optical axis of the objective is inclined from the optical axis of a microscope so as to satisfy the perspective control principle. An image of an object disposed on the object plane inclined from said optical axis of the microscope is formed in the focal plane of an eyepiece perpendicular to said optical axis of the microscope and the field curvature of said objective is retained in said focal plane of the eyepiece perpendicular to said optical axis of the microscope.

16 Claims, 25 Drawing Figures

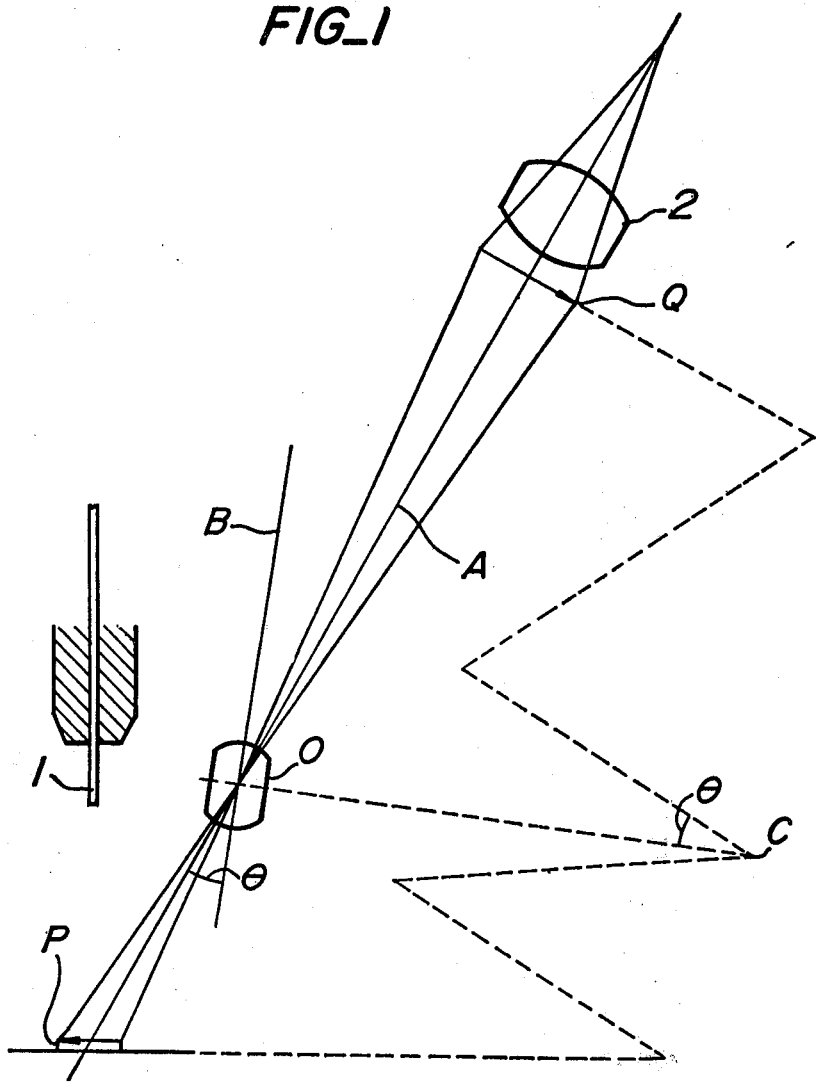

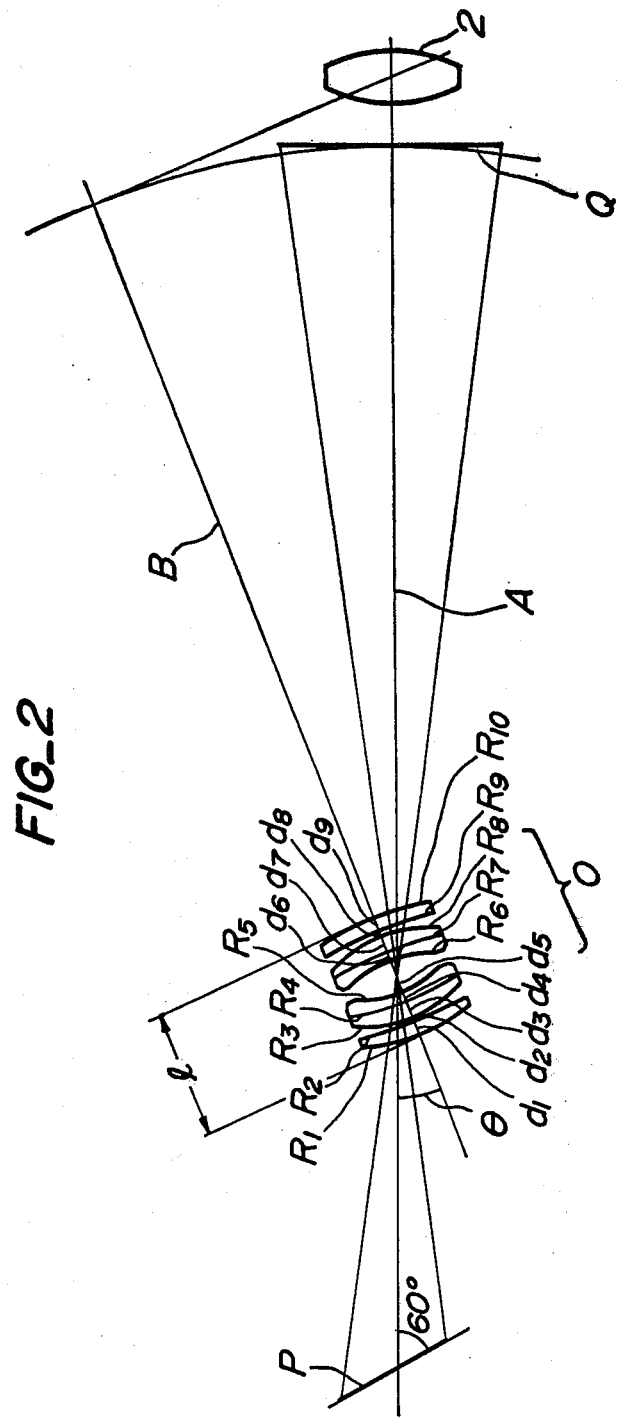

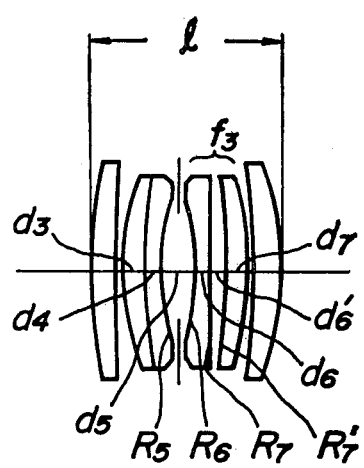
FIG_3

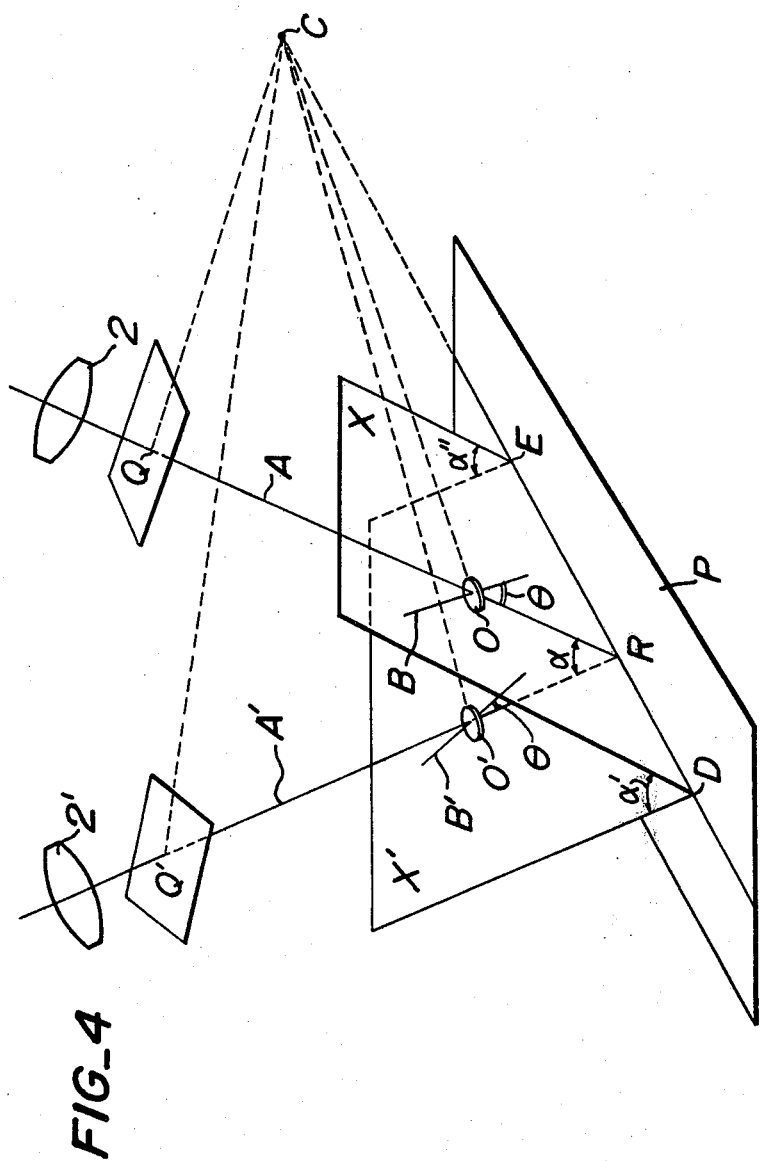
FIG_4

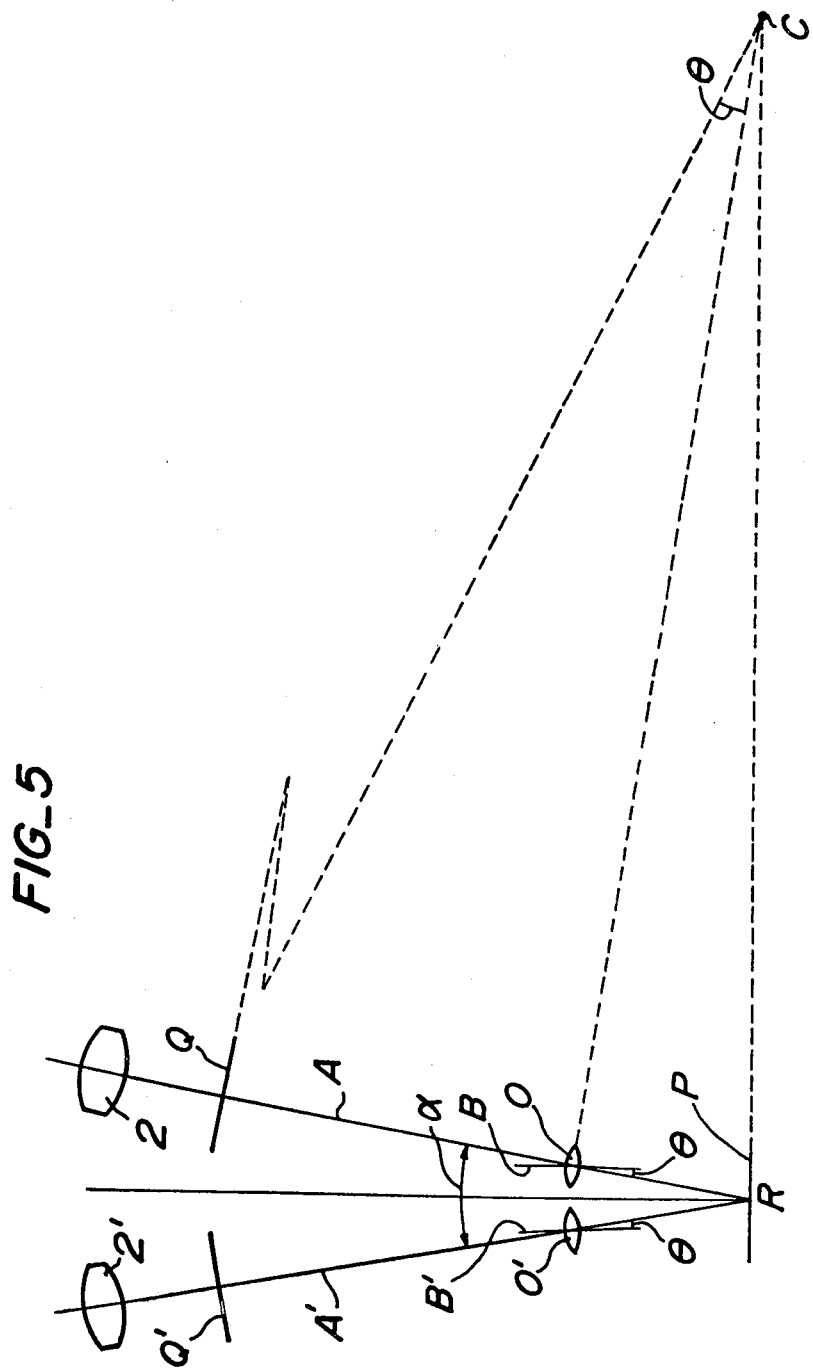

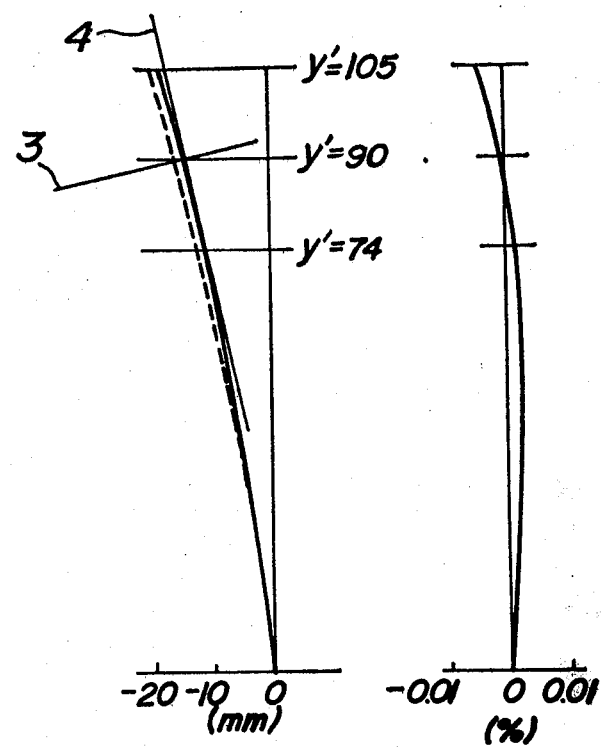
FIG_6A  FIG_6B

FIG_6C
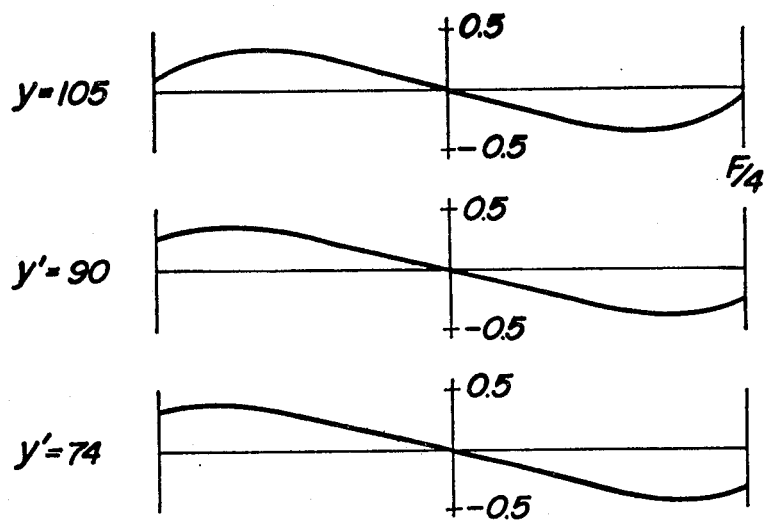
FIG_6D
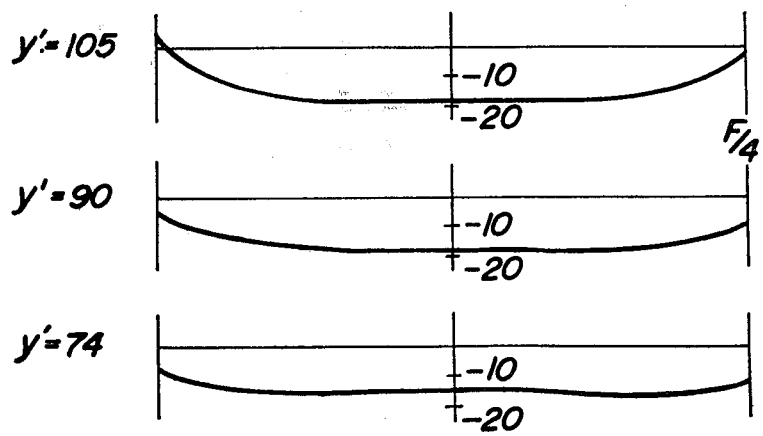

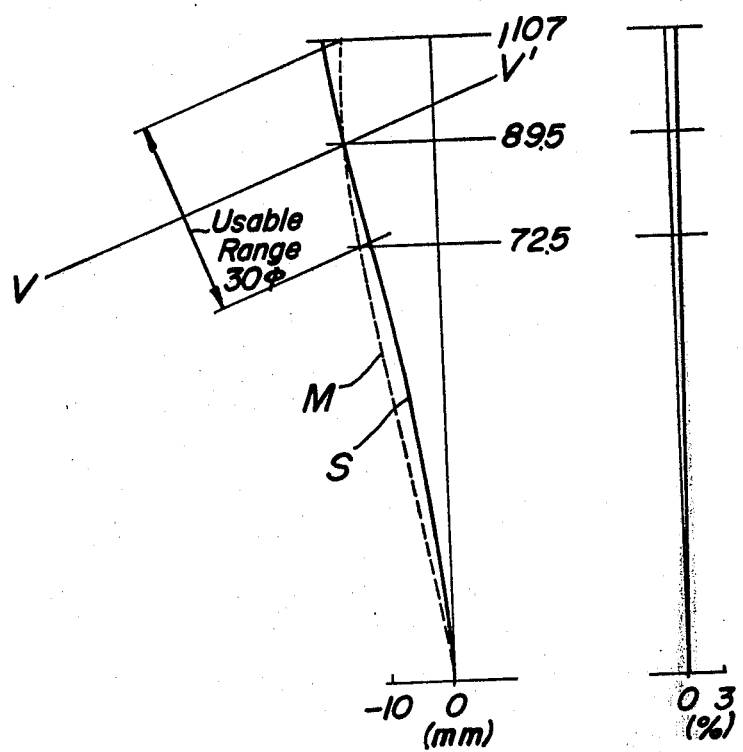

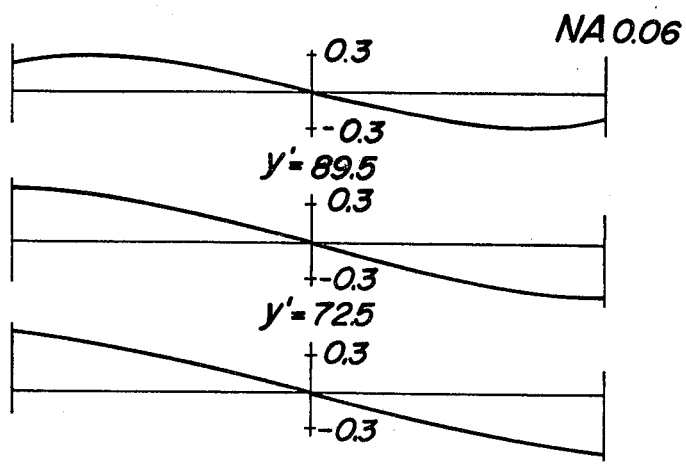
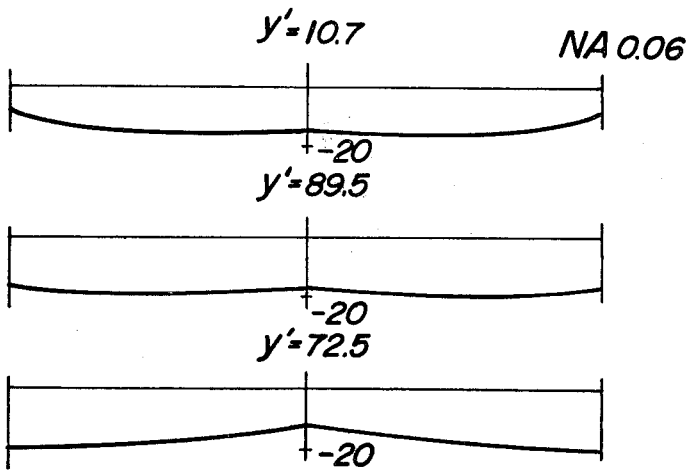

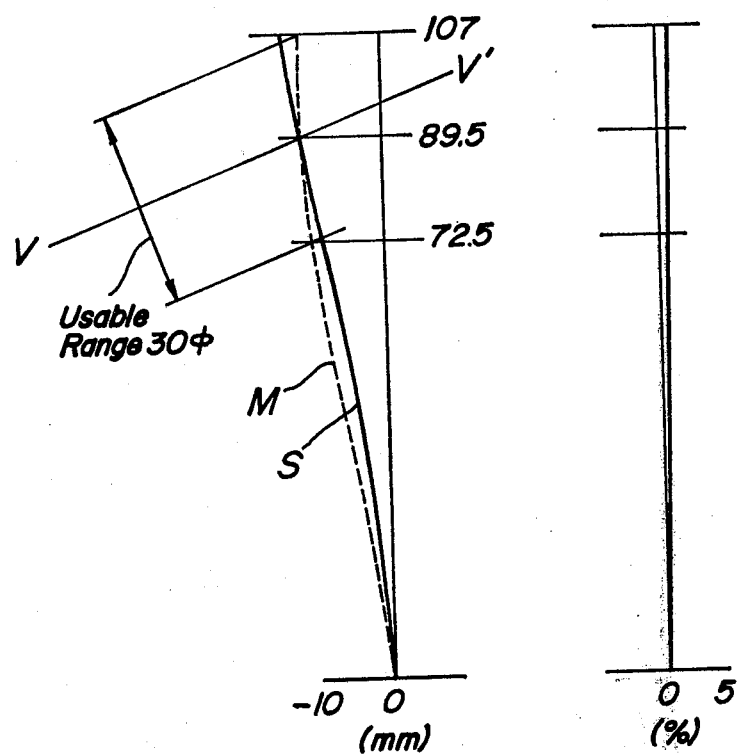

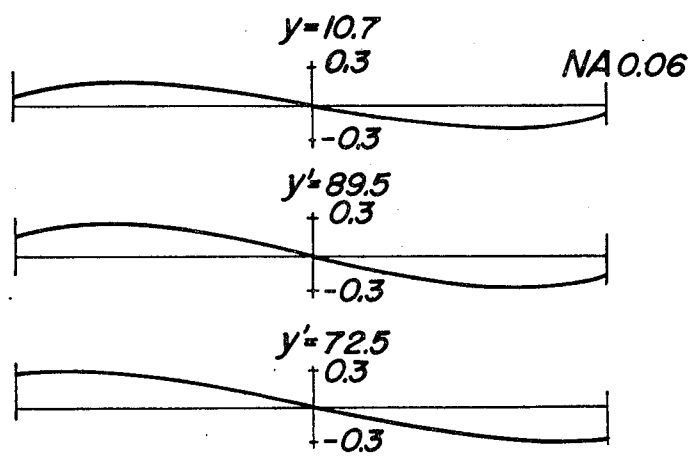
FIG_8C
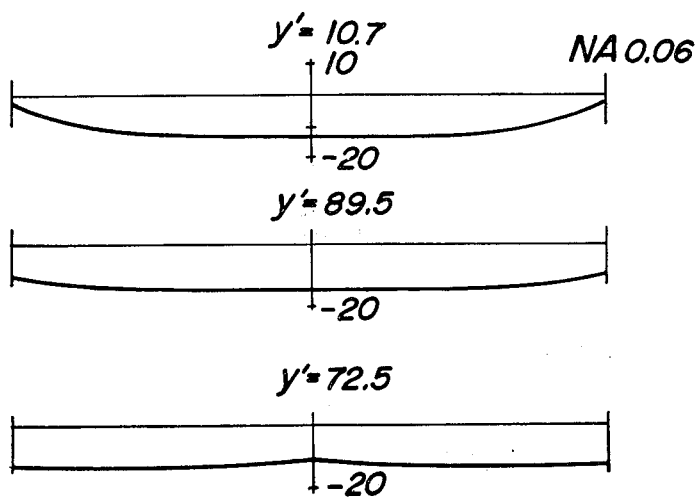
FIG_8D

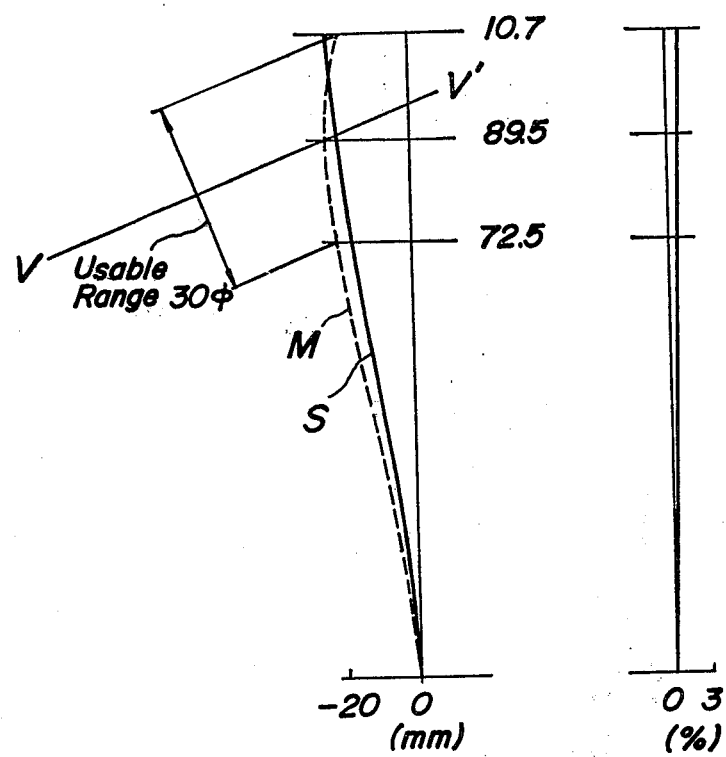

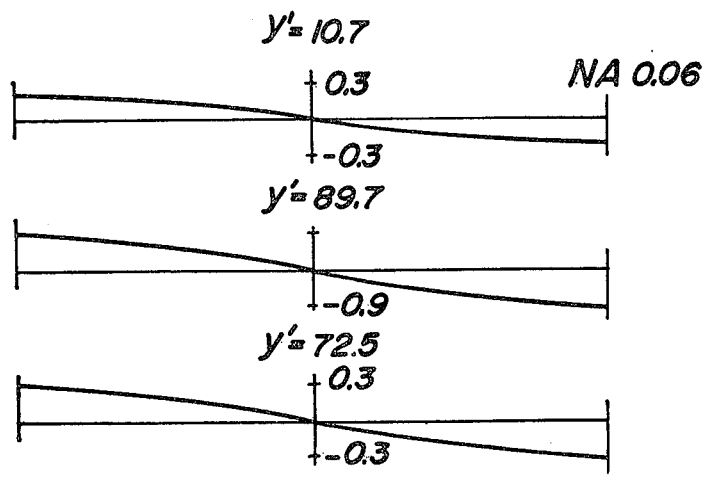
FIG_9C
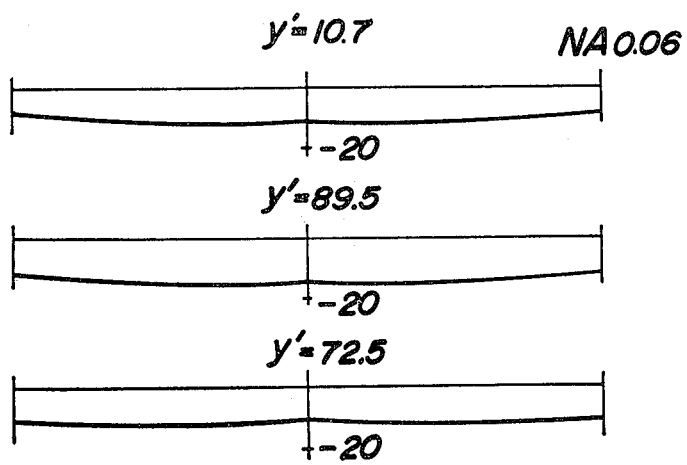
FIG_9D

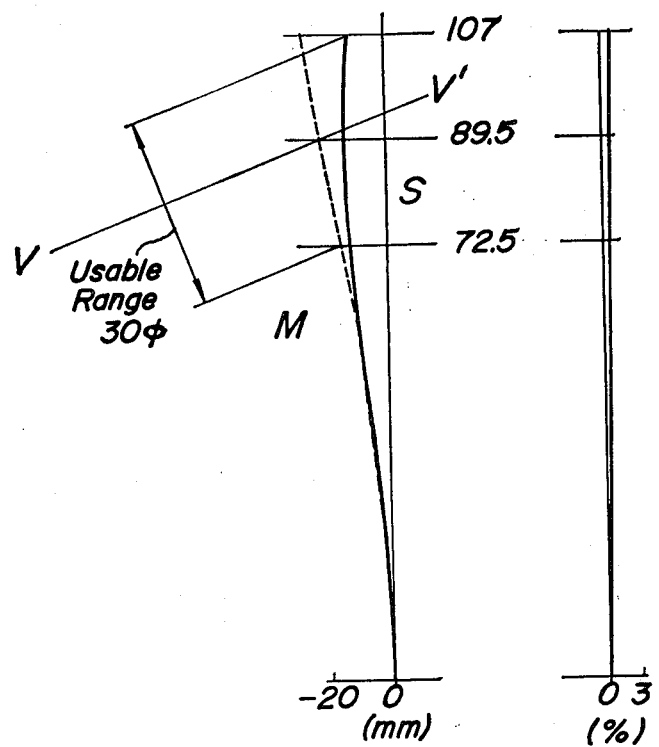
FIG_10A FIG_10B

*FIG_10C*
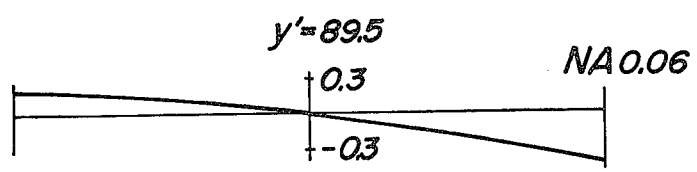
*FIG_10D*
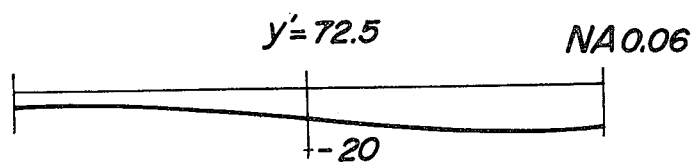

MICROSCOPE OBJECTIVES OF GAUSSIAN TYPE HAVING INCLINED OPTICAL AXIS

This invention relates to microscope objectives and more particularly a binocular stereo-microscope objective which is capable of forming the image of an object disposed on the object plane inclined from the optical axes of the microscope on image planes perpendicular to the optical axes of the microscope, respectively.

In the semiconductor manufacturing field, for example, an integrated circuit is manufactured while observing an integrated circuit chip by means of a microscope. In such a case, it is preferable to observe the integrated circuit chip from a direction inclined therefrom. In addition, during the operation it is preferable to observe the integrated circuit chip by means of a binocular stereomicroscope. However, such perspective observation of the object with the aid of the conventional microscope results in the disadvantage that the observation is limited to only a part of the object owing to the relation between the focussing depth and various aberrations of objectives.

Heretofore, it has been well known to make use of the perspective control principle which has often been applied to camera lenses and in which the axis of the objective is inclined from the optical axis of the microscope so as to form a precise image of the object while observing it from a direction inclined therefrom.

The use of such perspective control principle makes it possible to form an image of the object inclined from the optical axis of the microscope in a focal plane of the eyepiece perpendicular to the optical axis of the microscope. Even in this case, that range of the field of view of the object surface inclined from the optical axis of the microscope which is in focus is not sufficiently wide enough and the image formed is inferior in quality.

In a binocular stereo-microscope whose two optical axes cross at a point in the object plane and form an interior angle therebetween, their optical axes are not perpendicular to the object plane, but are inclined therefrom to form an internal angle therebetween. Thus, the image of the object disposed on the object plane is not precisely formed on the focal plane of the eyepiece perpendicular to the optical axis of the microscopes.

In practice, the interior angle formed between the two optical axes of the microscope is of a small value on the order from 3° to 6°, and as a result, the displacement of the image is of insignificance and hence it is possible to observe a part near the center of the field of view without hindrance. Such small interior angle, however, has an infuence upon the periphery of the field of view which causes a problem of producing an inferior quality image.

The field aperture of 22$\phi$, for example, has a little influence upon the periphery of the field of view. The superwide field aperture on the order of 30$\phi$, however, results in an inferior quality image at the periphery of field of view which could not be neglected, thereby rendering the provision of superwide field of view meaningless.

An object of the invention is to provide a microscope objective which can not only make a wide field of view in focus but also make the image surface flat and which can significantly correct various aberrations.

Another object of the invention is to provide a microscope objective which can positively make use of the field curvature of the objective so as to obtain a wide field of view in focus on the order of the field aperture of 30$\phi$ and which can improve the image quality.

A further object of the invention is to provide a binocular stereo-microscope objective which makes use of the perspective control principle and which is designed to form good quality images of an object disposed on the object plane inclined from optical axes of the microscope on focal planes of the eyepieces perpendicular to the optical axes of the microscope, respectively.

A still further object of the invention is to provide a binocular stereo-microscope objective which is capable of obviating the disadvantages of the prior art microscope caused by the presence of the interior angle and designed to operate with a superwide field aperture and with substantial suppression of degradation of the image at the periphery of the field of view.

The invention will now be described in greater detail with reference to the accompanying drawings, wherein:

FIG. 1 is a diagrammatic view showing a microscope objective according to the invention used in the case of manufacturing integrated circuits;

FIG. 2 is a diagrammatic view showing the construction of the microscope objective shown in FIG. 1;

FIG. 3 illustrates another embodiment of the microscope objective according to the invention;

FIG. 4 is a perspective view showing one embodiment of the binocular stereo-microscope objectives according to the invention;

FIG. 5 is a diagrammatic representation of another embodiment of the binocular stereo-microscope objectives according to the invention;

FIGS. 6A to 6D are graphical representations of the various aberrations as related to the form of microscope objective described in Example 1;

FIGS. 7A to 7D are graphical representations of the various aberrations as related to the form of microscope objective described in Example 2;

FIGS. 8A to 8D are graphical representations of the various aberrations as related to the form of microscope objective described in Example 3;

FIGS. 9A to 9D are graphical represenntations of the various aberrations as related to the form of microscope objective described in Example 4; and FIGS. 10A to 10D are graphical representations of the various aberrations as related to the conventional microscope objective lens not perspectively observed.

In FIG. 1 is shown a microscope objective according to the invention. Referring to FIG. 1, P designates an object being observed such as an integrated circuit chip and the like, 1 a wire for connecting the integrated circuit chip P to an exterior lead wire of package (not shown), and A an optical axis of the microscope and inclined from the object P being observed.

The optical axis B of an objective O is inclined from the optical axis A of the microscope. That is, the optical axis B of the objective O is inclined from the optical axis A of the microscope by an angle $\theta$ such that the image plane Q of the object P produced by the objective O is made perpendicular to the optical axis A of the microscope. The image plane Q is magnified by an eyepiece 2 and then is observed.

In accordance with the invention the optical axis B of the objective O is inclined from the optical axis A of the microscope by an angle $\theta$ such that an extension drawn from the principal plane of the objective O substantially coincides with an intersecting line C where an extension drawn from the object plane P and an extension drawn from the image plane Q across each other as shown in FIG. 1. The construction as above described is capable of making the object plane P being observed and inclined from the optical axis A of the microscope in focus all over the field of view Q perpendicular to the optical axis A of the microscope. In addition, if the objective O is designed to operate for superwide field of view, the diameter of the objective O can be made smaller than that of a conventional objective through which the object plane P is observed from the position perpendicular to the object plane P and it is only necessary to correct peripheral aberrations of the image plane. The use of these measures is quite beneficial to the design of the objective lens.

Thus, the measure of inclining the optical axis B of the objective O from the optical axis A of the microscope by the above described angle $\theta$ makes it possible to enlarge the field of view in focus if compared with that obtained by the mere perspective observation of the object plane P. This measure makes use of light beam traversing the periphery of the objective O and hence has the disadvantage that the range of the field of view maintaining sufficient illumination is narrow and that images are inferior in quality.

In FIG. 2 is shown one embodiment of the objective O as constructed according to the invention. The objective O shown is an objective lens having a small magnification and can be supplied to a binocular stereo-microscope.

In the objective shown in FIG. 2, the optical axis A of the microscope is inclined from the object plane P being observed by 60°. Thus, this inclined angle of the optical axis A of the microscope from the object plane P is constant so that various aberrations of the objective O are significantly corrected on its periphery about the optical axis B of the objective O.

In this case, however, symmetrical coma at the periphery of the image plane Q becomes a problem which must be solved. In the present invention, provision is made of an objective of the Gaussian type in order to solve the above problem. In addition, in order to make the image surface of the object being observed flat, the field curvature is maintained at the periphery of the objective O and this field curvature of the objective is remained in the focal plane Q of the eyepiece 2 perpendicular to the optical axis A of the microscope, thereby making the image surface used in practice flat. That is, since the object plane P is inclined from the optical axis A of the microscope by 60°, the position of the focal plane Q of the eyepiece 2 formed by the inclined objective O is calculated such that the field curvature is produced by the periphery of the objective O so as to bring the field curvature into substantially coincidence with the focal plane Q, thereby enlarging the range within which is formed the image.

As stated hereinbefore, astigmatism is corrected with respect to the image surface used in practice and astigmatic difference is made sufficiently small.

The objective shown in FIG. 2 comprises six lenses arranged in four components successively from an object side. The first component is a positive meniscus lens. The second component is a doublet composed of a positive meniscus lens and a negative meniscus lens. The third component is a doublet composed of a negative meniscus lens adjoining a diaphragm and a positive meniscus lens. The fourth component is a positive meniscus lens. The objective O satisfies the following five conditions:

1. $0.1f < l < 0.4f$,
2. $0.2f < R_5 < 0.4f$,
3. $0.2f < |R_6| < 0.4f$, $R_6 < 0$,
4. $0.030f < d_3+d_4 < 0.08f$, and
5. $0.030f < d_6+d_7 < 0.08f$ wherein $f$ is the overall focal length of the objective, $l$ is the total length of the objective, $R_5$ and $R_6$ are the radii of curvature of the lens faces adjoining the diaphragm, $d_3$ and $d_4$ are the axial lens thicknesses of the two lenses of the second component, respectively, and $d_6$ and $d_7$ are the axial lens thicknesses of the two lenses of the third component, respectively.

The above described conditions defined by the invention make it possible to bring the field curvature of the objective O into substantial coincidence with an image plane Q perpendicular to the optical axis A of the microscope shown in FIG. 2, thereby significantly correcting various aberrations at the image plane Q. That is, the image plane Q is corrected such that the image plane Q is inclined from the optical axis B of the objective O instead of making the image plane Q perpendicular to the optical axis B of the objective O. This is because of the fact that the object plane P is inclined from the optical axis A of the microscope so that the position at which the image of the object plane P is formed is calculated, and that the optical axis B of the objective O is inclined from the optical axis A of the microscope by a suitable angle $\theta$ so as to form the image of the object plane P on the image plane Q which is perpendicular to the optical axis A of the microscope.

As seen from FIG. 2, that part of the objective O which is used in practice is only that part of the objective O which has a large picture angle, and as a result, this part of the objective O only is corrected in abberations. In this case, it is sufficient to correct the aberrations out of axis only. But, since the aberration on the optical axis A of the microscope coorresponds to the spherical aberration on axis, so-called coma must sufficiently be corrected. In addition, there is a difficult problem that a suitable amount of the field curvature must be produced with a minimum astigmatism.

In accordance with the invention, use is made of the Gaussian type objective whose asymmetrical aberrations are small so as to sufficiently correct the transverse aberration out of axis. In addition, the objective according to the invention is so designed that the total length $l$ of the lens becomes shortened, and that a suitable amount of the field curvature is produced. Furthermore, the radii of curvature of the lens surfaces $R_5$ and $R_6$ adjoining the diaphragm are so selected that the astigmatism is corrected.

The conditions defined by the invention will now be described in greater detail.

The first condition (1) $0.1f < l < 0.4f$ must be satisfied in order to produce a suitable amount of the image surface curvature. The lens satisfying the condition (1) becomes shorter in its total length than the conventional lenses. This is the most important feature of the objective according to the invention. It is the best way to select the total length $l$ of the objective which lies within the upper and lower limits defined by the condition (1). If $l$ exceeds the upper limit $0.4f$, the image surface curvature aimed at could not be obtained. If $l$ is smaller than $0.1f$, the other aberrations become worse and these aberrations could not be corrected by means of the other parts of the objective.

The condition (2) $0.2f < R_5 < 0.4f$ and the condition (3) $0.2f < |R_6| < 0.4f$ must be satisfied in order to correct astigmatism and coma, respectively. If the radii of curvature $R_5$ and $|R_6|$ are selected within the limits defined by the conditions (2) and (3), respectively, both the astigmatisms and comas are significantly corrected. If $R_5$ and $|R_6|$ are smaller than the lower limit $0.2f$, the coma becomes worse. If $R_5$ and $|R_6|$ exceed the upper limit $0.4f$, the astigmatism becomes large in an unallowable extent.

The condition (4) $0.030f < d_c+d_4 < 0.08f$ and the condition (5) $0.030f < d_6+d_7 < 0.08f$ must be satisfied in order to control the longitudinal aberration out of axis. If $d_3+d_4$ and $d_6+d_7$ are selected within the limits defined by the conditions (4) and (5), respectively, it is possible to maintain a suitable amount of the longitudinal aberration out of axis. If $d_3+d_4$ and $d_6+d_7$ exceed the upper limit $0.08f$, respectively, the amount of the longitudinal aberration out of axis is decreased and hence the image surface is shifted in a positive direction to locate it outside the image surface aimed at. If $d_3+d_4$ and $d_6+d_7$ are smaller than the lower limit $0.030f$, respectively, the amount of the longitudinal aberration out of axis is increased and hence the image surface is shifted in a negative direction to locate it outside the image surface aimed at.

In case of correcting aberrations, it is impossible to completely suppress the astigmatic difference all over the image plane. The use of the measures described provides the advantage that the meridional and saggital light beams are caused to be intersected at least near the optical axis of the microscope so as to maintain substantially the same and small astigmatism at each end of the image plane. The inventor has found out that if the resultant focal length $f_3$ of the third component satisfies a condition $f < |f_3| < 6f$ ($f_3 < 0$), it is possible to completely suppress the astigmatic difference all over the image plane.

In FIG. 3 is shown another embodiment of the microscope objective according to the invention. In the present embodiment, the third component is two singlets composed of a negative meniscus adjoining the diaphragm and a positive meniscus separated therefrom by an air space. The other lenses are constructed and arranged in the same manner as those shown in FIG. 2.

In FIG. 4 is illustrated the perspective control principle which is applied to the binocular stereo-microscope. The optical axes A, A' of the microscope are not perpendicular to an object plane P but are inclined therefrom and cross at a point R on the object plane P to form an interior angle $\alpha$ therebetween. In order to form images of an object disposed on the object plane P inclined from the optical axes A, A' of the microscope on image planes Q, Q' perpendicular to the optical axes A, A' of the microscope, respectively, it is necessary to incline the optical axes B, B' of the objectives O, O' from the optical axes A, A' of the microscope by an angle $\theta$, respectively, such that extensions drawn from the principal surfaces of the objective O, O' substantially coincide with an intersecting line C where an extension drawn from the object P and extensions drawn from the image planes Q, Q' cross each other.

As shown in FIG. 4, both optical axes A, A' of the microscope are inclined from the object plane P and cross each other at the point R to form the internal angle $\alpha$ therebetween. X, X' designate planes formed by a straight line DE which is formed by a plane passing through the point R and vertically bisecting a plane formed by the two optical axes A, A' of the microscope and the optical axes A, A' of the microscope, respectively.

In accordance with the invention, the optical axes B, B' of the two objective O, O' are inclined in the planes X, X' from the optical axes A, A' of the microscope by an angle $\theta$, respectively. If the optical axes B, B' of the two objective lenses O, O' are inclined from the optical axes A, A' of the microscope in planes other than the planes X, X', the optical axes A, A' of the microscope do not cross on the object plane P, and as a result, the image of the object disposed on the object plane P could not be formed on the image planes Q, Q'.

The planes X and X' cross at the line DE and form angles $\alpha$, $\alpha'$ and $\alpha''$ formed therebetween, the relation among these angles being given by $$\alpha' > \alpha > \alpha''.$$

In FIG. 5 is shown another embodiment of the binocular stereo-microscope objective according to the invention, in which P designates an object plane, O, O' objectives and Q, Q' image planes. Optical axes A, A' of the microscope are not perpendicular to the object plane P and are inclined from the object plane P and cross at a point R on the object plane P to form an internal angle $\alpha$ therebetween. The optical axes A, A' of the microscope are perpendicular to the image planes Q, Q', respectively.

In the conventional binocular stereo-microscope, the optical axes A, A' of the microscope coincide with the optical axes B, B' of the objective lenses O, O', respectively, so that correct images of an object disposed on the object plane P could not be formed on the image planes Q, Q', respectively.

In order to solve this problem, the invention makes use of the perspective control principle. That is, the optical axis B of the objective lens O is inclined from the optical axis A of the microscope by an angle $\theta$ such that an extension draw from the principal plane of the objective lens O substantially coincides with an intersecting line C where an extension drawn from the object plane P and an extension drawn from the image plane Q cross each other.

Similarly, the optical axis B' of the objective lens O' is inclined from the optical axis A' of the microscope by $\theta$ so as to satisfy the perspective control principle.

The use of the measures described provides the important advantage that high quality images of the object disposed on the object plane P are formed on the image planes Q, Q' perpendicular to the optical axes A, A' of the microscope, respectively, and that the image forming property is not hindered even when the wide field of view is applied.

In case of the internal angle $\alpha = 6°$, for example, if the magnifications of the objective lenses are 1X, 2X, and 4X, respectively, $\theta$ is given by 3°, 4°2' and 3°35', respectively.

Even if use is made of a zoom lens having a magnification on the order of 0.8 to 2.0, there is little change in the position of the principal plane of the lens. Thus, in practice it is possible to make the angle $\theta$ constant without causing any problem. In this case, the extension drawn from the principal plane of the objective O, O' does not precisely coincide with the intersecting line C, but substantially coincides with it.

The invention will now be described with reference to preferred embodiments of the invention.

EXAMPLE 1

In the present embodiment, the objective is constructed as shown in FIG. 2 and the third component is a doublet composed of a negative meniscus lens adjoining a diaphragm space and a positive meniscus lens separated therefrom by a cemented surface. The parameters of the present embodiment are as follows.

| | | | |
|---|---|---|---|
| $R_1$ 0.5707 | | | |
| | $d_1$ 0.035 | $n_1$ 1.6583 | $\nu_1$ 57.3 |
| $R_2$ 1.2687 | | | |
| | $d_2$ 0.003 | | |
| $R_3$ 0.3122 | | | |
| | $d_3$ 0.039 | $n_2$ 1.6779 | $\mu_2$ 55.3 |
| $R_4$ 0.7662 | | | |
| | $d_4$ 0.022 | $n_3$ 1.6259 | $\nu_3$ 35.7 |
| $R_5$ 0.2568 | | | |
| | $d_5$ 0.084 | | |
| $R_6$ −0.2424 | | | |
| | $d_6$ 0.022 | $n_4$ 1.6259 | $\nu_4$ 35.7 |
| $R_7$ −0.8072 | | | |
| | $d_7$ 0.039 | $n_5$ 1.6779 | $\nu_5$ 55.3 |
| $R_8$ −0.3146 | | | |
| | $d_8$ 0.003 | | |
| $R_9$ −1.0148 | | | |
| | $d_9$ 0.035 | $n_6$ 1.6583 | $\nu_6$ 57.3 |
| $R_{10}$ −0.4741 | | | |
| f=1 | $\Sigma d_i$ =0.282 $\beta$=2.0X | NA=0.08 | |

In FIGS. 6A to 6D are shown the various aberrations as related to the form of the objective described in the Example 1.

In FIGS. 6A to 6D, the ordinate represents that for the optical axis B of the objective shown in FIG. 2 and the image height $y'$ used in practice for forming the image is from $y'=74$ to $y'=105$. In FIG. 6A showing the astigmatism, reference numeral 3 designates the optical axis A of the microscope and 4 shows the ordinate with respect to the optical axis A of the microscope, that is, the practical image surface position. In FIGS. 6B, 6C and 6D are graphically represented distortion, transverse aberration out of axis and longitudinal aberration out of axis, respectively.

EXAMPLE 2

In the present embodiment, the objective is constructed as shown in FIG. 2 and the third component is a doublet composed of a negative meniscus lens adjoining a diaphragm space and a positive meniscus lens separated therefrom by a cemented surface. The parameters of the present embodiment are as follows.

| | | | |
|---|---|---|---|
| f=1.0 | | | |
| $R_1$ 0.375 | | | |
| | $d_1$ 0.032 | $n_1$ 1.678 | $\nu_1$ 55.3 |
| $R_2$ 0.710 | | | |
| | $d_2$ 0.003 | | |
| $R_3$ 0.293 | | | |
| | $d_3$ 0.026 | $n_2$ 1.658 | $\nu_2$ 53.4 |
| $R_4$ 0.719 | | | |
| | $d_4$ 0.017 | $n_3$ 1.626 | $\nu_3$ 35.7 |
| $R_5$ 0.234 | | | |
| | $d_5$ 0.035 | | |
| $R_6$ −0.243 | | | |
| | $d_6$ 0.017 | $n_4$ 1.626 | $\nu_4$ 35.7 |
| $R_7$ −0.598 | | | |
| | $d_7$ 0.026 | $n_5$ 1.670 | $\nu_5$ 47.3 |
| $R_8$ −0.291 | | | |
| | $d_8$ 0.003 | | |
| $R_9$ −0.623 | | | |
| | $d_9$ 0.032 | $n_6$ 1.678 | $\nu_6$ 55.3 |
| $R_{10}$ −0.403 | | | |
| $f_3$=−5.38 | $\Sigma d_i$=0.191 | | |

In FIGS. 7A, 7B, 7C and 7D are graphically represented the astigmatism, distortion, transverse aberration out of axis and longitudinal aberration out of axis, respectively, as related to the form of present embodiment.

EXAMPLE 3

In the present embodiment, the objective lens is also constructed as shown in FIG. 2 and the third component is a doublet composed of a negative meniscus lens adjoining a diaphragm space and a positive meniscus lens separated therefrom by a cemented surface. The parameters of the present embodiment are as follows.

| | | | |
|---|---|---|---|
| f=1.0 | | | |
| $R_1$ 0.384 | | | |
| | $d_1$ 0.031 | $n_1$ 1.678 | $\nu_1$ 55.3 |
| $R_2$ 0.787 | | | |
| | $d_2$ 0.003 | | |
| $R_3$ 0.297 | | | |
| | $d_3$ 0.028 | $n_2$ 1.658 | $\nu_2$ 53.4 |
| $R_4$ 0.716 | | | |
| | $d_4$ 0.017 | $n_3$ 1.626 | $\nu_3$ 35.7 |
| $R_5$ 0.232 | | | |
| | $d_5$ 0.057 | | |
| $R_6$ −0.242 | | | |
| | $d_6$ 0.017 | $n_4$ 1.626 | $\nu_4$ 35.7 |
| $R_7$ −0.596 | | | |
| | $d_7$ 0.028 | $n_5$ 1.670 | $\nu_5$ 47.3 |
| $R_8$ −0.296 | | | |
| | $d_8$ 0.003 | | |
| $R_9$ −0.666 | | | |
| | $d_9$ 0.031 | $n_6$ 1.678 | $\nu_6$ 55.3 |
| $R_{10}$ −0.408 | | | |
| $f_3$=−4.2 | $\Sigma d_i$=0.215 | | |

In FIGS. 8A, 8B, 8C and 8D are graphically represented the astigmatism, distortion, transverse aberration out of axis and longitudinal aberration out of axis, respectively, as related to the form of present embodiment.

EXAMPLE 4

In the present embodiment, the objective lens is constructed as shown in FIG. 3 and the third component is two singlets composed of a negative meniscus lens adjoining a diaphragm space and a positive meniscus lens separated therefrom by an air space $d'_6$. The parameters of the present embodiment are as follows.

| | | | |
|---|---|---|---|
| f=1.0 | | | |
| $R_1$ 0.733 | | | |
| | $d_1$ 0.031 | $n_1$ 1.678 | $\nu_1$ 50.7 |
| $R_2$ 3.706 | | | |
| | $d_2$ 0.028 | | |
| $R_3$ 0.315 | | | |
| | $d_3$ 0.031 | $n_2$ 1.649 | $\nu_2$ 53.0 |
| $R_4$ 0.602 | | | |
| | $d_4$ 0.018 | $n_3$ 1.626 | $\nu_3$ 39.1 |
| $R_5$ 0.284 | | | |
| | $d_5$ 0.042 | | |
| $R_6$ −0.260 | | | |

-Continued

| | $d_6$ 0.018 | $n_4$ 1.573 | $\nu_4$ 35.5 |
|---|---|---|---|
| $R_7$ −1.945 | | | |
| | $d'_6$ 0.014 | | |
| $R'_7$ −0.659 | | | |
| | $d_7$ 0.031 | $n_5$ 1.67 | $\nu_5$ 57.3 |
| $R_8$ −0.326 | | | |
| | $d_8$ 0.028 | | |
| $R_9$ −0.952 | | | |
| | $d_9$ 0.031 | $n_6$ 1.678 | $\nu_6$ 55.3 |
| $R_{10}$ −0.390 | | | |
| | $\Sigma d_i$=0.272 | | |
| $f_3$=−1.3 | | | |

In FIGS. 9A, 9B, 9C and 9D are graphically represented the astigmatism, distortion, transverse aberration out of axis and longitudinal aberration out of axis, respectively, as related to the form of present embodiment.

In FIGS. 10A, 10B, 10C and 10D are graphically represented the astigmatism, distortion, transverse aberration out of axis and longitudinal aberration out of axis, respectively, as related to the conventional not perspectively observed objective lens.

These graphs are shown for the sake of comparison with those shown in FIGS. 6, 7, 8 and 9.

As seen from comparison between the various aberrations shown in FIGS. 6, 7, 8 and 9 on the one hand and those shown in FIG. 10 on the other hand, the objective according to the invention has excellent characteristics when it is applied to perspective microscopes.

The binocular stereo-microscope makes use of that part of an objective lens which has a large picture angle, so that it is sufficient enough to correct aberrations produced by this part of the objective lens. In such a case, it is necessary to correct the aberrations out of axis. Since aberrations on the optical axes of the microscope correspond to spherical aberration on axis, coma must also be corrected. In addition, a suitable amount of image plane curvature must be produced and astigmatic differences must also be corrected.

The embodiment of the objective lens as above described makes use of the Gaussian type objective lens with least unsymmetrical aberrations and is designed to sufficiently correct the transverse aberration out of axis, shorten the total length of the lens, produces a suitable amount of the image surface curvature, and select radii of curvature of the lens surfaces adjoining the diaphragm so as to correct the astigmatic difference.

What is claimed is:

1. In a microscope optical system which comprises microscope whose optical axis is inclined from an object plane and in which an object image is perpendicular to said microscope optical axis, the improvement wherein a microscope objective lens is inclined from said microscope optical axis such that that surface of said objective lens which passes through a principal point of said objective lens coincides with an extension connecting said principal point of said objective lens to an intersection point where an extension drawn from said object plane and an extension drawn in a direction perpendicular to said microscope optical axis at the position of said object image cross each other and the image curvature of said objective lens for light beams through the peripheral zone thereof coincides with said object image which is perpendicular to said microscope optical axis.

2. A microscope optical system as claimed in claim 1 wherein said microscope is a binocular stereo-microscope whose two optical axes form an interior angle therebetween and a bisector line of said two microscope optical axes is inclined from an object plane and in which two object images are perpendicular to said two microscope optical axes, respectively, and two microscope objective lenses are inclined from said two microscope optical axes, respectively, such that those surfaces of said two objective lenses which pass through principal points of said two objective lenses, respectively coincide with two extensions connecting said principal points of said two objective lenses to two intersection points between two extensions drawn from said object plane on the one hand and two extensions drawn in a direction perpendicular to said two microscope optical axes at the position of said two object images, respectively, on the other hand, and the image curvature of each of said two objective lenses for light beams through the peripheral zone thereof coincides with each of said two object images which is perpendicular to each of said two microscope axes.

3. A binocular stereo-microscope objective as claimed in claim 2, wherein each of said objectives is of the Gaussian type and comprises six lenses arranged in four components successively from an object side, said first component is a positive meniscus lens, said second component is a doublet including a positive meniscus lens and a negative meniscus lens, said third component is a doublet including a negative meniscus lens adjoining a diaphragm and a positive meniscus lens separated therefrom by a cemented surface, and said fourth component is a positive meniscus lens, and which satisfies the following five conditions, i.e., 1. $0.19f < l < 0.29f$,
2. $0.23f < R_5 < 0.29f$,
3. $0.24f < |R_6| < 0.265f$, $R_6 < 0$
4. $0.043f < d_3 + d_4 < 0.06f$,
5. $0.043f < d_6 + d_7 < 0.063f$ wherein $f$ is the overall focal length of the objective, $l$ is the total length of the objective $R_5$ and $R_6$ are the radii of curvature of the lens faces opposed to a diaphragm, respectively, $d_3$ and $d_4$ are the axial lens thicknessess of the two lenses of the second component, respectively, and $d_6$ and $d_7$ are the axial lens thicknesses of the two lenses of the third component, respectively.

4. A binocular stereo-microscope objective as claimed in claim 3 wherein each of said objective further satisfies the condition $$f < |f_3| < 6f \ (f_3 < 0)$$

where $f_3$ is the resultant focal length of the third component.

5. A binocular stereo-microscope objective as claimed in claim 12, wherein each of said objective is of the Gaussian type and comprises six lenses arranged in four components successively from an object side, said first component is a positive meniscus lens, said second component is a doublet including a positive meniscus lens and a negative meniscus lens, said third component is two singlets including a negative meniscus lens adjoining a diaphragm and a positive meniscus lens separated therefrom by air space and said fourth component is a positive meniscus lens, and which satisfies the following five conditions, i.e., 1. $0.19f < l < 0.29f$
2. $0.23f < R_5 < 0.29f$,
3. $0.24f < |R_6| < 0.265f$, $R_6 < 0$ 4. $0.043f < d_3 + d_4 < 0.061f$, 5. $0.043f < d_6 + d_7 < 0.063f$ wherein $f$ is the overall focal length of the objective, $l$ is the total length of the objective, $R_5$ and $R_6$ are the radii of curvature of the lens faces opposed to a diaphragm, respectively, $d_3$ and $d_4$ are the axial lens thicknesses of the two lenses of the second component, respectively, and $d_6$ and $d_7$ are the axial lens thicknesses of the two lenses of the third component, respectively.

6. A binocular stereo-microscope objective as claimed in claim 5 wherein each of said objectives further satisfies the condition $$f < |f_3| < 6f \; (f_3 < 0)$$

where $f_3$ is the resultant focal length of the third component.

7. A microscope optical system as claimed in claim 1 wherein said microscope is a binocular stereo-microscope whose two optical axes form an interior angle therebetween and a bisector line of said two optical axes is perpendicular to an object plane and in which two object images are perpendicular to said microscope axes, respectively, and two microscope objective lenses are inclined from said microscope optical axes, respectively, such that those surfaces of said two objective lenses which pass through principal points of said two objective lenses, respectively, coincide with two extensions connecting said principal points of said two objective lenses to two intersection points between two extensions drawn from said object plane on the one hand and two extensions drawn in a direction perpendicular to said two microscope axes at the positions of said two object images, respectively, on the other hand, and the image curvature of each of said two objective lenses for light beams through the peripheral zone thereof coincides with each of said two object images which is perpendicular to each of said two microscope axes.

8. A microscope optical system as claimed in claim 1, wherein said microscope is a binocular stereo-microscope whose two optical axes form an interior angle therebetween and a bisector line of said two microscope optical axes is inclined from an object plane and in which two object images are perpendicular to said two microscope optical axes, respectively, and two microscope objective lenses are inclined from said two microscope optical axes, respectively, such that those surfaces of said two objective lenses which pass through principal points of said two objective lenses, respectively, coincide with two extensions connecting said principal points of said two objective lenses to one intersection point between one extension drawn from said object plane on the one hand and two extensions drawn in a direction perpendicular to said two microscope optical axes at the positions of said two object images, respectively, on the other hand, and the image curvature of each of said two objective lenses for light beams through the peripheral zone thereof coincides with each of said two object images which is perpendicular to each of said two microscope axes.

9. A microscope objective as claimed in claim 1 wherein said objective is of the Gaussian type and comprises six lenses arranged in four components successively from an object side, said first component is a positive meniscus lens, said second component is a doublet including a positive meniscus lens and a negative meniscus lens, said third component is a doublet including a negative meniscus lens adjoining a diaphragm and a positive meniscus lens separated therefrom by a cemented surface, and said fourth component is a positive meniscus lens, and which satisfies the following five conditions, i.e.

1. $0.19f < l < 0.29f$,
2. $0.23f < R_5 < 0.29f$,
3. $0.24f < |R_6| < 0.265f$, $R_6 < 0$
4. $0.043f < d_3 + d_4 < 0.061f$,
5. $0.043f < d_6 + d_7 < 0.063f$ wherein $f$ is the overall focal length of the objective, $l$ is the total length of the objective, $R_5$ and $R_6$ are the radii of curvature of the lens faces opposed to a diaphragm, respectively, $d_3$ and $d_4$ are the axial lens thicknesses of the two lenses of the second component, respectively, and $d_6$ and $d_7$ are the axial lens thicknesses of the two lenses of the third component, respectively.

10. A microscope objective as claimed in claim 9 wherein said objective further satisfies the condition $$f < |f_3| < 6f \; (f_3 < 0)$$

where $f_3$ is the resultant focal length of the third component.

11. A microscope objective as claimed in claim 1 wherein said objective is of the Gaussian type and comprises six lenses arranged in four components successively from an object side, said first component is a positive meniscus lens, said second component is a doublet including a positive meniscus lens and a negative meniscus lens, said third component is two singlets including a negative meniscus lens adjoining a diaphragm and a positive meniscus lens, separated therefrom by an air space, and said fourth component is a positive meniscus lens, and which satisfied the following five conditions, i.e., 1. $0.19f < l < 0.29f$,
2. $0.23f < R_5 < 0.29f$,
3. $0.24f < |R_6| < 0.265f$, $R_6 < 0$
4. $0.43f < d_3 + d_4 < 0.061f$,
5. $0.043f < d_6 + d_7 < 0.063f$ wherein $f$ is the overall focal length of the objective, $l$ is the total length of the objective, $R_5$ and $R_6$ are the radii of curvature of the lens faces opposed to a diaphragm, respectively, $d_3$ and $d_4$ are the axial lens thicknesses of the two lenses of the second component, respectively, and $d_6$ and $d_7$ are the axial lens thicknesses of the two lenses of the third component, respectively.

12. A microscope as claimed in claim 11 wherein said objective further satisfies the condition $$f < |f_3| < 6f \; (f_3 < 0)$$

where $f_3$ is the resultant focal length of the third component.

13. A microscope objective corrected for astingmatism, distortion, coma, transverse and longitudinal aberrations out of axis and field curvature consisting of six lenses in optical alignment with each other and constructed according to the constructional data given herebelow.

| | | | |
|---|---|---|---|
| $R_1$ 0.5707 | | | |
| $R_2$ 1.2687 | $d_1$ 0.035 | $n_1$ 1.6583 | $\nu_1$ 57.3 |
| $R_3$ 0.3122 | $d_2$ 0.003 | | |
| $R_4$ 0.7662 | $d_3$ 0.039 | $n_2$ 1.6779 | $\nu_2$ 55.3 |
| | $d_4$ 0.022 | $n_3$ 1.6259 | $\nu_3$ 35.7 |

-Continued

| | | | |
|---|---|---|---|
| $R_5$ 0.2568 | $d_5$ 0.084 | | |
| $R_6$ -0.2424 | $d_6$ 0.022 | $n_4$ 1.6259 | $\nu_4$ 35.7 |
| $R_7$ -0.8072 | $d_7$ 0.039 | $n_5$ 1.6779 | $\nu_5$ 55.3 |
| $R_8$ -0.3146 | $d_8$ 0.003 | | |
| $R_9$ -1.0148 | $d_9$ 0.035 | $n_6$ 1.6583 | $\nu_6$ 57.3 |
| $R_{10}$ -0.4741 | $\Sigma d_i$=0.282 | | |
| f=1 | $\beta$=2.0X | NA=0.08. | | wherein $R_1$ to $R_{10}$ inclusive designate the lens curvatures, $d_1$ to $d_9$ inclusive designate the lens thicknesses and spaces between the lenses, $n_1$ to $n_6$ designate the refractive index of the respective lenses and $\nu_1$ to $\nu_6$ designate the Abbe number of said lenses numbering from the front to the rear of said system.

14. A microscope objective corrected for astigmatism, distortion, coma, transverse and longitudinal aberrations out of axis and field curvature consisting of six lenses in optical alignment with each other and constructed according to the constructional data given hereinbelow.

| | | | |
|---|---|---|---|
| f=1.0 | | | |
| $R_1$ 0.375 | $d_1$ 0.032 | $n_1$ 1.678 | $\nu_1$ 55.3 |
| $R_2$ 0.710 | $d_2$ 0.003 | | |
| $R_3$ 0.293 | $d_3$ 0.026 | $n_2$ 1.658 | $\nu_2$ 53.4 |
| $R_4$ 0.719 | $d_4$ 0.017 | $n_3$ 1.626 | $\nu_3$ 35.7 |
| $R_5$ 0.234 | $d_5$ 0.035 | | |
| $R_6$ -0.243 | $d_6$ 0.017 | $n_4$ 1.626 | $\nu_4$ 35.7 |
| $R_7$ -0.598 | $d_7$ 0.026 | $n_5$ 1.670 | $\nu_5$ 47.3 |
| $R_8$ -0.291 | $d_8$ 0.003 | | |
| $R_9$ -0.623 | $d_9$ 0.032 | $n_6$ 1.678 | $\nu_6$ 55.3 |
| $R_{10}$ -0.403 | $\Sigma d_i$=0.191 | | |
| $f_3$=-5.38. | | | | wherein $R_1$ to $R_{10}$ inclusive designate the lens curvature, $d_1$ to $d_9$ inclusive designate the lens thicknesses and spaces between the lenses, $n_1$ to $n_6$ designate the refractive index of the respective lenses and $\nu_1$ to $\nu_6$ to designate the Abbe number of said lenses numbering from the front to the rear of said system.

15. A microscope objective corrected for astigmatism, ditortion, coma, transverse and longitudinal aberrations out of axis and field curvature consisting of six lenses in optical alignment with each other and constructed according to the constructional data given herebelow.

| | | | |
|---|---|---|---|
| f=1.0 | | | |
| $R_1$ 0.384 | $d_1$ 0.031 | $n_1$ 1.678 | $\nu_1$ 55.3 |
| $R_2$ 0.787 | $d_2$ 0.003 | | |
| $R_3$ 0.297 | $d_3$ 0.028 | $n_2$ 1.658 | $\nu_2$ 53.4 |
| $R_4$ 0.716 | $d_4$ 0.017 | $n_3$ 1.626 | $\nu_3$ 35.7 |
| $R_5$ 0.232 | $d_5$ 0.057 | | |
| $R_6$ -0.242 | $d_6$ 0.017 | $n_4$ 1.626 | $\nu_4$ 35.7 |
| $R_7$ -0.596 | $d_7$ 0.028 | $n_5$ 1.670 | $\nu_5$ 47.3 |
| $R_8$ -0.296 | $d_8$ 0.003 | | |
| $R_9$ -0.666 | $d_9$ 0.031 | $n_6$ 1.678 | $\nu_6$ 55.3 |
| $R_{10}$ -0.408 | $\Sigma d_i$=0.215 | | |
| $f_3$=-4.2. | | | | wherein $R_1$ to $R_{10}$ inclusive designate the lens curvatures, $d_1$ to $d_9$ inclusive designate the lens thicknesses and spaces between the lenses, $n_1$ to $n_6$ designate the refractive index of the respective lenses and $\nu_1$ to $\nu_6$ designate the Abbe number of said lenses numbering from the front to the rear of said system.

16. A microscope objective corrected for astigmatism, distortion, coma, transverse and longitudinal aberrations out of axis and field curvature consisting of six lenses in optical alignment with each other and constructed according to the constructional data given herebelow.

| | | | |
|---|---|---|---|
| f=1.0 | | | |
| $R_1$ 0.733 | $d_1$ 0.031 | $n_1$ 1.678 | $\nu_1$ 50.7 |
| $R_2$ 3.706 | $d_2$ 0.028 | | |
| $R_3$ 0.315 | $d_3$ 0.031 | $n_2$ 1.649 | $\nu_2$ 53.0 |
| $R_4$ 0.602 | $d_4$ 0.018 | $n_3$ 1.626 | $\nu_3$ 39.1 |
| $R_5$ 0.284 | $d_5$ 0.042 | | |
| $R_6$ -0.260 | $d_6$ 0.018 | $n_4$ 1.573 | $\nu_4$ 35.5 |
| $R_7$ -1.945 | $d'_6$ 0.014 | | |
| $R'_7$ -0.659 | $d_7$ 0.031 | $n_5$ 1.67 | $\nu_5$ 57.3 |
| $R_8$ -0.326 | $d_8$ 0.028 | | |
| $R_9$ -0.952 | $d_9$ 0.031 | $n_6$ 1.678 | $\nu_6$ 55.3 |
| $R_{10}$ -0.390 | $\Sigma d_i$=0.272 | | |
| $f_3$=-1.3. | | | | wherein $R_1$ to $R_{10}$ inclusive designate the lens curvatures, $d_1$ to $d_9$ inclusive designate the lens thicknesses and spaces between the lenses, $n_1$ to $n_6$ designate the refractive index of the respective lenses and $\nu_1$ to $\nu_6$ designate the Abbe number of said lenses numbering from the front to the rear of said system.

* * * * *